United States Patent Office 3,465,018
Patented Sept. 2, 1969

3,465,018
DISILACYCLOHEXADIENES
William H. Atwell, Midland, Mich., assignor to Dow
  Corning Corporation, Midland, Mich., a corporation of
  Michigan
No Drawing. Continuation-in-part of application Ser. No.
  609,363, Jan. 16, 1967. This application July 19, 1967,
  Ser. No. 654,346
Int. Cl. C07f *7/18;* C07d *103/02*
U.S. Cl. 260—448.2                                    16 Claims

ABSTRACT OF THE DISCLOSURE

The compositions are of the class of disilacyclohexadienes which contain a functional group attached to the silicon atom, useful for the preparation of polymers which possesses excellent thermal stability. Illustrative of a member of the class is the compound

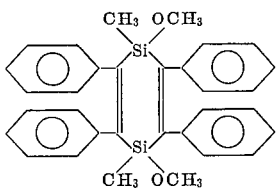

The disilacyclohexadiene compounds are prepared by heating to a temperature of at least 175° C. a mixture of a compound of th formula

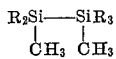

with a compound of the formula R'C≡CR', and thereafter recovering the novel disilacyclohexadiene. Illustrative of the preparation is the following:

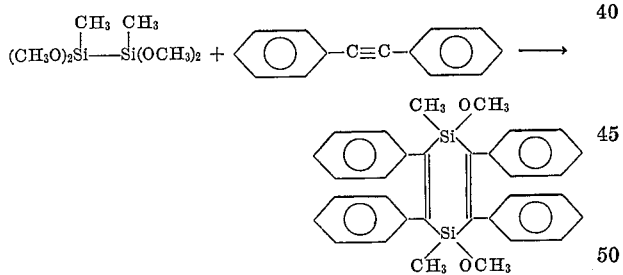

---

This application is a continuation-in-part of applicant's copending application, Ser. No. 609,363, filed Jan. 16, 1967, now abandoned.

This invention relates to novel disilacyclohexadienes, and more particularly to disilacyclohexadienes which contain a functional group attached to the silicon atom.

Recently, the disilacyclohexadiene ring system has been of considerable interest in organosilicon chemistry. At the present time the only two derivatives containing this ring system which are known are

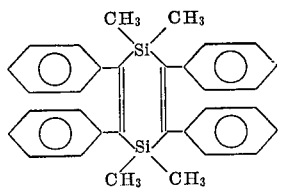

and

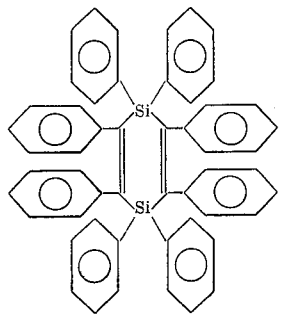

The compounds depicted above have been described in the literature, e.g., M. E. Volpin, Yu. D. Koreshkov, V. G. Dulova, and D. N. Kursanov, Tetrahedron 18, 107 (1962); R. West and R. E. Bailey, J. Amer. Chem. Soc. 85, 2871 (1963); H. Gilman, S. G. Cottis, and W. H. Atwell, J. Amer. Chem. Soc. 86, 1596 (1964); and F. Johnson, R. S. Gohlke, and W. A. Nasutavicus, J. Organometal. Chem. 3, 233 (1965).

It is an object of the present invention to provide novel compounds which are similar to the above with the exception that the novel compounds contain a functional group which is attached to the silicon atom. Such compounds are of considerable potential use in the preparation of polymers which possess excellent thermal stability and hence can be employed to produce coatings which will withstand high temperatures.

These and other objects will become readily apparent from the following detailed description of the invention.

This invention relates to novel disilacyclohexadienes which are selected from the group consisting of:

(A) Silanes of the general formula

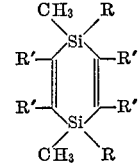

(B) Siloxanes consisting essentially of at least one unit of the general formula:

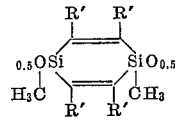

and any remaining units being of the formula

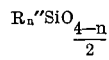

R is a monovalent substituent selected from the group
  consisting of hydrolyzable groups, hydrogen atoms, and
  hydroxyl radicals, each
R' is a substituent individually selected from the group
  consisting of an alkyl radical containing less than 6
  carbon atoms, a phenyl radical, and a hydrogen atom,
R'' is a monovalent substituent selected from the group
  consisting of hydrocarbon, halohydrocarbon radicals,
  and R groups, and $n$ is 0, 1, 2 or 3.

In the above formula the functional group R can be a hydroxyl group, a hydrogen atom, or any other hydrolyzable group. The term "hydrolyzable group" refers to any group attached to silicon which is hydrolyzed by water at room temperature between a pH of 5 and 10. Actually, the hydrogen atom may be hydrolyzable under certain conditions but is not included within the term for the purpose of this invention.

Silicon substituent groups which are hydrolyzable are well known in the art. Examples of such groups are alkoxy such as methoxy, ethoxy, propoxy, butoxy, isobutoxy and octadecyloxy (methoxy and ethoxy preferred); halogen atoms such as chlorine, fluorine, bromine and iodine; aryloxy radicals such as phenoxy, cresoxy and xenyloxy; substituted alkoxy ether radicals such as

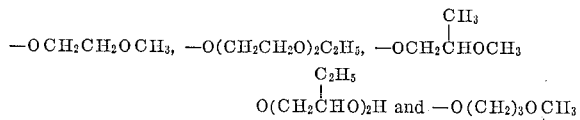

ketoxime radicals such as

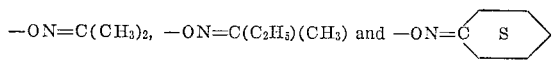

aryloxy radicals such as acetoxy, formyloxy, acrylyloxy, benzoyloxy and hexoyloxy; amino groups such as

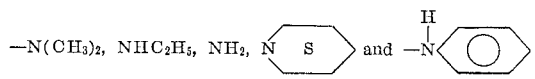

aminoxy radicals such as

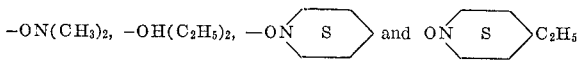

carbamate groups such as

sulfide groups such as —$SCH_3$, —$SC_6H_5$, —SH and —$SC_6H_{11}$; sulfonic groups such as

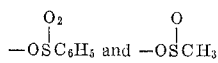

and the groups —N=C=O and —C≡N.

R' can be an alkyl radical containing less than 6 carbon atoms such as the methyl, ethyl, propyl, isopropyl, butyl, isobutyl, and amyl radical. For purposes of the present invention, methyl is to be preferred. R' can also be a phenyl radical or a hydrogen atom; and, as stated above, the phenyl radicals, alkyl radicals, and hydrogen atom can be present together in any feasible combination.

R'' can be any monovalent hydrocarbon or halohydrocarbon radical such as the methyl, ethyl, propyl, isopropyl, butyl, isobutyl, t-butyl, dodecyl, octadecyl, myricyl, pentyl, isopentyl, hexyl, isohexyl, cyclohexyl, cyclopentyl, methylcyclohexyl, cyclobutyl, cyclohexenyl, vinyl, allyl, methallyl, hexenyl, octadecenyl, beta-phenylpropyl, beta-phenylethyl, benzyl, chlorobenzyl, iodo-beta-phenylpropyl, chloromethyl, chlorobutyl, bromopropyl, 3,3,3-trifluoropropyl, gamma - chloropropyl, (perfluoroethyl) ethyl, (perfluoropentyl)ethyl, (perfluorononyl)ethyl, iodophenyl, alpha,alpha,alpha - trifluorotolyl, perfluorocyclohexenyl, phenyl, tolyl, xylyl, ethylphenyl, mesityl, methylethylphenyl, n-propylphenyl, isopropylphenyl, diethylphenyl, pentamethylphenyl, amylphenyl, butylmethylphenyl, propylmethylphenyl, cyclohexylmethylphenyl, diphenyl, anthracyl, naphthyl, m-bromotolyl, 2,6-dichlorotolyl, chlorophenyl, 9,10-dichloroanthrycyl, and the phenanthryl radical, among countless others.

As herein related, n can have a value of from 0 to 3 inclusive.

This invention also relates to a method for preparing novel disilacyclohexadienes comprising:
(A) heating to a temperature of at least 175° C. a mixture of
(1) a compound of the general formula

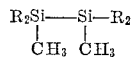

in which R is an alkoxy radical, with
(2) a compound of the general formula R'C≡CR',
in which R' is as defined above, and
(B) thereafter recovering the novel disilacyclohexadiene.

After the necessary rectants have been appropriately mixed, the admixture is subsequently heated to a temperature of at least 175° C. Although temperatures lower than 175° C. could conceivably be employed, the reaction would be far too slow to be practically suitable. There is no maximum critical temperature with respect to the above-described method; however, in view of commercial and practical considerations, it has been found that a temperature range of from 175° C. to 400° C. is particularly suitable.

The remaining silicon-functional disilacyclohexadienes of the present invention can be readily prepared by methods known in the art by employing the alkoxy-substituted product obtained above as one of the necessary reactants. For example, to prepare the halogen-substituted disilacyclohexadiene, one simply reacts the alkoxy-substituted product defined above with any acyl halide. Upon completion of the reaction, the halogen atom replaces the alkoxy radical as the functional group attached to the silicon atom of the disilacyclohexadiene.

To prepare the hydroxyl-substituted disilacyclohexadiene, one simply mixes the corresponding alkoxy-substituted disilacyclohexadiene in a suitable solvent such as diethyl ether, thereafter hydrolyzing the above admixture with dilute hydrochloric acid, whereby the alkoxy is replaced by the hydroxyl group as the functional substituent attached to the silicon atom of the disilacyclohexadiene.

To prepare the hydrogen-substituted disilacyclohexadiene, one mixes the corresponding halogen-substituted disilacyclohexadiene with a suitable reducing agent such as lithium aluminum hydride and a suitable solvent, e.g., ether. The above admixture is subsequently hydrolyzed with dilute hydrochloric acid whereby the hydrogen atom replaces the halogen atom as the functional substituent attached to the silicon atom of the disilacyclohexadiene.

The compositions of this invention which contain hydrolyzable groups other than alkoxy and halogen are best prepared from the corresponding halosilane or siloxane by reactions well known in the art. For example, phenoxy silanes can be prepared by reacting alkali metal phenoxide with ≡SiCl. The compositions containing sulfide groups can be made by reacting $H_2S$ or a mercaptan with ≡SiCl in the presence of a hydrogen halide acceptor such as pyridine. The carbamate and aminoxy silanes can be prepared as shown in U.S. Patent No. 3,284,485 and British Patent No. 999,123, respectively.

The siloxane polymers and copolymers of the present invention are prepared by known condensation procedures employing a suitable catalyst which promotes the condensation of the appropriate functional groups whereby the siloxane polymer or copolymer is produced.

The following examples are illustrative only and should not be construed as limiting the invention which is properly delineated in the appended claims.

Example 1

A mixture of 4.2 grams of

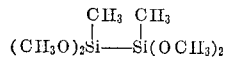

and 7.2 grams of

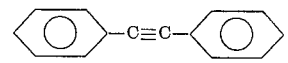

was heated in a sealed tube at 200° C. for 88 hours. The cooled reaction residue was crystallized from benzene to provide 2.6 (50%) grams of a product having the formula

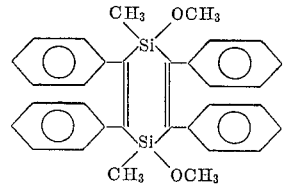

The above structure was confirmed by infrared and N.M.R. analyses.

Example 2

32 grams of

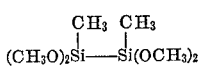

was passed (at a rate of 5 ml./hr.) through a column packed with glass beads and heated to a temperature of 400° C. Simultaneously, acetylene was also added to this vapor stream at a rate of 25 ml./min. The pyrolyzate mixture was collected and distilled to provide 15.2 (60%) grams of a product having the formula

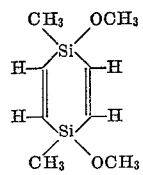

The above structure was confirmed by infrared and N.M.R. analyses.

Example 3

A mixture of 1.9 grams of the product of Example 1 and 1.19 grams of acetyl chloride was heated in a sealed tube at 100° C. for 48 hours. The reaction residue was crystallized to provide 1.71 grams (88%) of a product having the formula

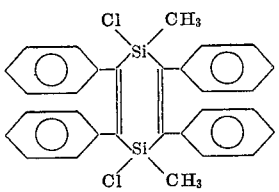

The above structure was confirmed by infrared and N.M.R. analyses.

Example 4

A mixture of 1.0 gram of the product of Example 3, 10 ml. of diethyl ether, and 50 ml. of dilute hydrochloric acid was stirred vigorously for 48 hours. The insoluble material was filtered and dried to provide 0.8 gram (86%) of a product having the formula

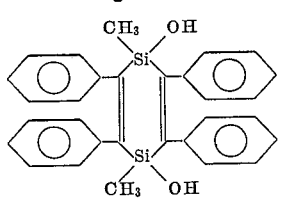

The above structure was confirmed by infrared and N.M.R. analyses.

Example 5

A mixture of 3.0 grams of the product of Example 3, and 0.45 gram of lithium aluminum hydride in 60 ml. of ether was refluxed overnight. The reaction was hydrolyzed with dilute hydrochloric acid which provided 2.0 grams (77%) of a product having the formula

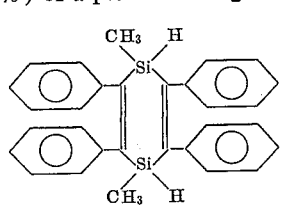

The above compound had a melting point of 226° C. to 245° C. and the structure was further confirmed by infrared and N.M.R. analyses.

Example 6

A mixture of 10 grams of

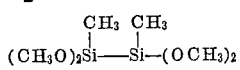

and 14 grams of $CH_3C{\equiv}CCH_3$ was heated in a sealed tube at 225° C. for 16 hours. The volatiles were removed by means of a rotary evaporator and the residue crystallized from anhydrous methanol to provide 3.2 grams (35.7%) of a product having the formula

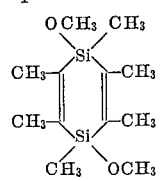

The above structure was confirmed by infrared and N.M.R. analyses.

Example 7

A mixture of 1.0 gram of the product of Example 4 and 1.0 gram of the product of Example 1 was refluxed in toluene using 2.0% tetramethylguanidine: trifluoroacetic acid (1:4 ratio) as a catalyst. Using azeotroping conditions, the majority of the toluene was removed over a 15 hour period after which the remaining toluene was removed on a rotary evaporator. The residue was extracted with refluxing hexane and filtered to provide 1.4 grams (74%) of a polymer having the unit formula

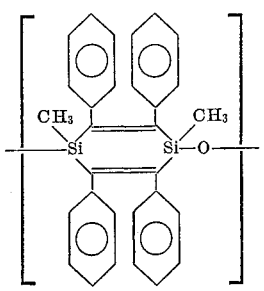

The above product had a melting point of 10° C. to 320° C.

Example 8

A mixture of 2.0 grams of the product of Example 3, 25.0 ml. of ether and 50.0 ml. of dilute hydrochloric acid was stirred rapidly for 15 hours. Evaporation of the ether resulted in a residue which was recrystallized from ethanol to provide 1.5 grams (72%) of a product having the formula

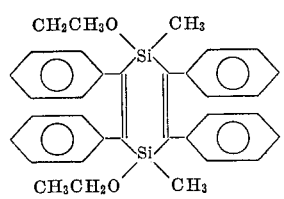

The above structure was confirmed by infrared and N.M.R. analyses.

Example 9

A mixture of

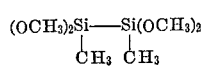

and 22.4 grams of

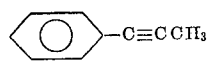

was heated in a sealed tube at 225° C. for 16 hours. The cooled reaction was crystallized from methanol to provide 3.4 grams (21%) of a product having the formula

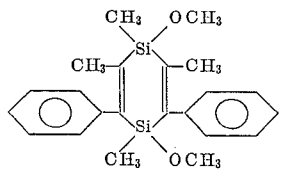

The above structure was confirmed by elemental and spectral analyses.

Example 10

When a compound of the formula

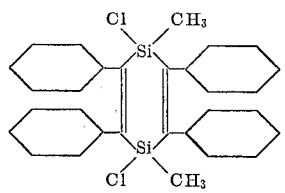

and a silane of the formula

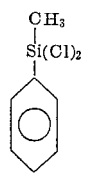

are cohydrolyzed and cocondensed in the presence of zinc octoate, a copolymer having the unit formulae

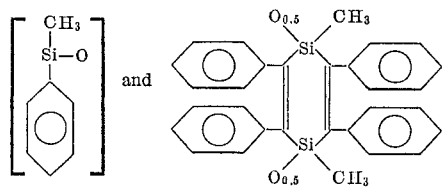

is obtained.

Example 11

When a compound of the formula

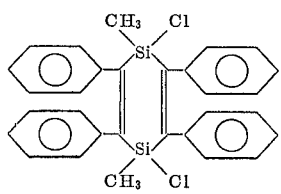

was reacted under anhydrous conditions in the presence of calcium carbonate and benzene with two moles of a substituted hydroxylamine of the formula $(CH_3)_2NOH$, a product of the formula

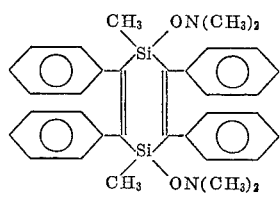

was obtained.

Example 12

When a compound of the formula

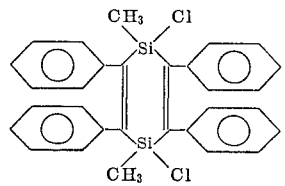

was reacted with two moles of sodium acetate in toluene, a product of the formula

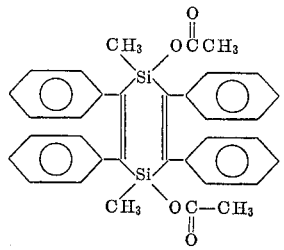

was obtained.

Example 13

When a solution of a compound of the formula

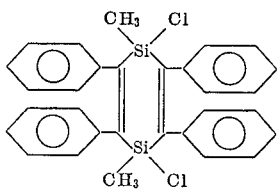

in diethyl ether is added to four moles of diethyl amine at room temperature, a product of the formula

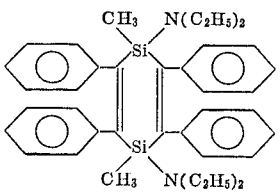

was obtained.

Example 14

When two moles of acetone oxime in a mixture of dioxane and heptane were added to a mixture of

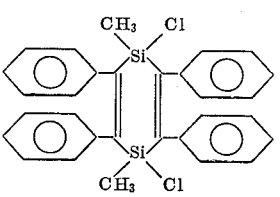

pyridine, and heptane and agitated, a product of the formula

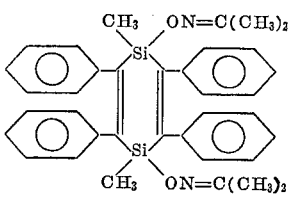

was obtained.

Example 15

When a compound of the formula

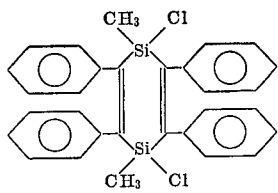

was added to a mixture of two moles of isopropylamine and dry toluene and heated to reflux, a product of the formula

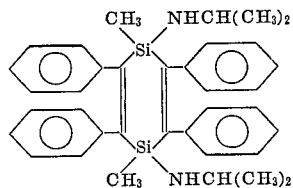

was obtained.

That which is claimed is:

1. Novel disilacyclohexadienes which are selected from the group consisting of
   (A) silanes of the general formula

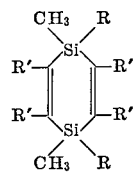

(B) siloxanes consisting essentially of at least one unit of the general formula

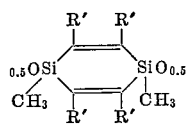

and any remaining units being of the formula

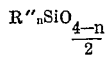

in which,
   R is a monovalent substituent selected from the group consisting of hydrolyzable groups, hydrogen atoms, and hydroxyl radicals, each
   R' is a substituent individually selected from the group consisting of an alkyl radical containing less than 6 carbon atoms, phenyl radical, and a hydrogen atom,
   R" is a monovalent substituent selected from the group consisting of hydrocarbon and halohydrocarbon radicals, and R groups and $n$ is 0, 1, 2, or 3.

2. The disilacyclohexadiene as recited in claim 1 which is a silane of the Formula A.

3. The disilacyclohexadiene as recited in claim 2 wherein the formula is

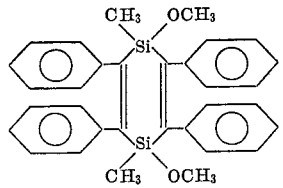

4. The disilacyclohexadiene as recited in claim 2 wherein the formula is

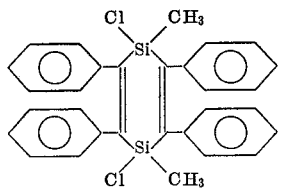

5. The disilacyclohexadiene as recited in claim 2 wherein the formula is

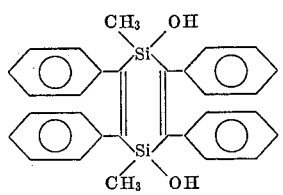

6. The disilacyclohexadiene as recited in claim 2 wherein the formula is

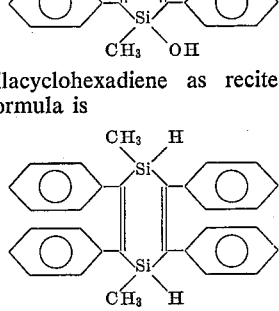

7. The disilacyclohexadiene as recited in claim 2 wherein the formula is

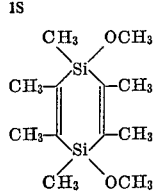

8. The disilacyclohexadiene as recited in claim 2 wherein the formula is

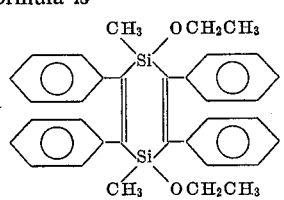

9. The disilacyclohexadiene as recited in claim 2 wherein the formula is

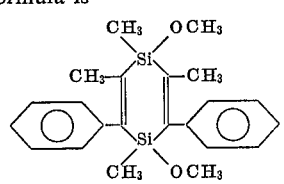

10. The disilacyclohexadiene as recited in claim 2 wherein the formula is

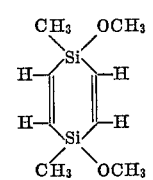

11. The disilacyclohexadiene as recited in claim 1 which is a siloxane of the Formula B.

12. A method for preparing novel disilacyclohexadienes comprising, (A) mixing to a temperature of at least 175° C. a mixture of
(1) a compound of the general formula

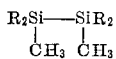

in which R is an alkoxy radical, with
(2) a compound of the formula R'C≡CR', in which R' is a substituent individually selected from the group consisting of an alkyl radical containing less than 6 carbon atoms, phenyl radical, and a hydrogen atom, and
(B) thereafter recovering the novel disilacyclohexadiene.

13. The method as recited in claim 12 wherein compound (1) has the formula

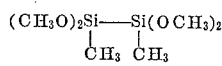

and compound (2) has the formula

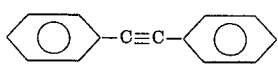

14. The method as recited in claim 12 wherein compound (1) has the formula

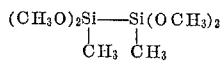

and compound (2) has the formula HC≡CH.

15. The method as recited in claim 12 wherein compound (1) has the formula

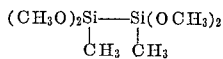

and compound (2) has the formula $CH_3C≡CCH_3$.

16. The method as recited in claim 12 wherein compound (1) has the formula

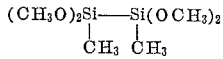

and compound (2) has the formula

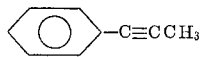

References Cited

UNITED STATES PATENTS 3,105,085  9/1963  Toporcer _____ 260—448.2
3,314,980  4/1967  Rudner _____ 260—448.2 XR TOBIAS E. LEVON, Primary Examiner J. P. PODGORSKI, Assistant Examiner U.S. Cl. X.R.

117—161; 260—46.5, 448.8